United States Patent
Haas et al.

(10) Patent No.: US 6,764,671 B2
(45) Date of Patent: Jul. 20, 2004

(54) DIRECT SYNTHESIS OF HYDROGEN PEROXIDE AND INTEGRATION THEREOF INTO OXIDATION PROCESSES

(75) Inventors: Thomas Haas, Frankfurt (DE); Guido Stochniol, Gelnhausen (DE); Jürgen Rollmann, Pflaumheim (DE)

(73) Assignee: Degussa AG, Dusseldorf (DE)

( * ) Notice: Subject to any disclaimer, the term of this patent is extended or adjusted under 35 U.S.C. 154(b) by 0 days.

(21) Appl. No.: 10/254,746

(22) Filed: Sep. 25, 2002

(65) Prior Publication Data

US 2003/0083510 A1 May 1, 2003

(30) Foreign Application Priority Data

Oct. 30, 2001 (DE) .......................................... 101 53 546

(51) Int. Cl.[7] .............................................. C01B 15/01
(52) U.S. Cl. ....................................................... 423/584
(58) Field of Search ......................................... 423/584

(56) References Cited

U.S. PATENT DOCUMENTS

| | | | |
|---|---|---|---|
| 3,361,533 A | | 1/1968 | Hooper |
| 4,336,238 A | | 6/1982 | Dalton, Jr. et al. |
| 4,832,938 A | * | 5/1989 | Gosser et al. ............... 423/584 |
| 5,338,531 A | * | 8/1994 | Chuang et al. ............. 423/584 |
| 5,447,706 A | * | 9/1995 | Van Weynbergh et al. . 423/584 |
| 5,500,202 A | * | 3/1996 | Germain et al. ............ 423/584 |
| 5,840,934 A | | 11/1998 | Goto et al. |
| 6,168,775 B1 | * | 1/2001 | Zhou et al. .................. 723/584 |
| 6,375,920 B2 | * | 4/2002 | Fischer et al. .............. 423/584 |
| 6,576,214 B2 | * | 6/2003 | Zhou et al. .................. 423/584 |
| 6,630,118 B2 | * | 10/2003 | Paparatto et al. ........... 423/584 |
| 2001/0003578 A1 | | 6/2001 | Fischer et al. |
| 2001/0024634 A1 | * | 9/2001 | Bertsch-Franti et al. |
| 2002/0025293 A1 | * | 2/2002 | Paparatto et al. |
| 2003/0017094 A1 | * | 1/2003 | Fischer et al. |

FOREIGN PATENT DOCUMENTS

| | | |
|---|---|---|
| DE | 0 049 806 A1 | 4/1982 |
| DE | 196 42 770 A1 | 4/1998 |
| DE | 0 978 316 A1 | 2/2000 |
| DE | 198 57 137 A1 | 6/2000 |
| DE | 1 038 833 A1 | 9/2000 |
| DE | 199 12 733 A1 | 9/2000 |

OTHER PUBLICATIONS

European Search Report, dated Oct. 28, 2002, for European Patent Application No. EP02019914.7 3 pages.

* cited by examiner

*Primary Examiner*—Wayne A. Langel
(74) *Attorney, Agent, or Firm*—Smith, Gambrell & Russell

(57) ABSTRACT

Aqueous-organic or organic hydrogen peroxide solutions can be produced by direct synthesis in the presence of a catalyst fixed bed and an organic solvent. According to the invention, a non-explosive gas mixture comprising $H_2$ and $O_2$ is employed and a liquid reaction medium comprising organic solvent and bromide and/or iodide is passed over the fixed bed with a cross-section loading of at least 0.3 m/h. In the case of a trickle bed procedure with a cross-section loading of 0.3 m/h to 2 m/h, 4 to 10 wt. % methanolic $H_2O_2$ solutions can be prepared with a high productivity.

22 Claims, No Drawings

DIRECT SYNTHESIS OF HYDROGEN PEROXIDE AND INTEGRATION THEREOF INTO OXIDATION PROCESSES

INTRODUCTION AND BACKGROUND

The present invention relates to a process for the preparation of hydrogen peroxide by direct synthesis, wherein hydrogen and oxygen are reacted in the presence of a noble metal catalyst, which is bonded to a support or is support-free and is arranged in a fixed bed, and an aqueous-organic or organic solvent, in particular an alcoholic solvent, containing a halide and an acid. The invention also relates to the integration of the process according to the invention into oxidation processes.

It is known to prepare hydrogen peroxide by the anthraquinone process. In this, an anthraquinone derivative is hydrogenated in an organic phase, the intermediate product is oxidized with an oxygen-containing gas in a subsequent stage, and the product is then extracted from the organic phase with water or dilute hydrogen peroxide solution. The aqueous hydrogen peroxide solution obtained in this way is conventionally concentrated to a concentration in the range from 30 to 80 wt. %.

While aqueous hydrogen peroxide solutions are employed in bleaching processes in papermaking and in waste water purification processes, for carrying out oxidation processes on organic substrates using hydrogen peroxide in the presence of a catalyst it is often necessary first to convert the aqueous hydrogen peroxide solution into an organic phase. There is accordingly increasingly a need for organic or organic-aqueous hydrogen peroxide solutions which can be fed directly, that is to say without prior isolation of an aqueous hydrogen peroxide solution, to an oxidation process which is carried out substantially in an organic phase.

The teaching of EP 0 978 316 A1 is an integrated process for a catalytic oxidation process on an organic substrate, the first stage of which comprises preparation of hydrogen peroxide by direct synthesis from hydrogen and oxygen in the presence of a noble metal catalyst, which is bonded to a support, and an organic solvent. The organic hydrogen peroxide solution obtained in this first stage is brought into contact, in an immediately subsequent second stage in the presence of an oxidation catalyst, with the organic substrate to be oxidized. In the context of working up of the reaction mixture of the oxidation stage, the solvent employed in the $H_2O_2$ direct synthesis is recovered and recycled into the first stage.

The catalyst for the direct synthesis is a metal of group VIII, in particular palladium, on an active charcoal support which contains sulfonic acid groups. The catalyst is employed in suspended form, namely in an amount in the range from $10^{-6}$ to $10^{-2}$ mol of metal per 1 of reaction medium.

The solvent in the direct synthesis is preferably methanol. The organic substrates to be oxidized are olefins, aromatic hydrocarbons, ammonia and carbonyl compounds, which are oxidized in the presence of a titanium silicalite catalyst.

A disadvantage of this process is that the support material employed for the catalyst in the direct synthesis is a modified active charcoal, the preparation of which is expensive. The process furthermore requires expensive filtration and recycling measures for the suspension catalyst. In an industrial plant for the direct synthesis of hydrogen peroxide using a catalyst bed of this catalyst bonded to active charcoal instead of the corresponding suspension catalyst, an undesirable and, where appropriate, uncontrolled oxidation of the active charcoal by means of a percarboxylic acid formed as a by-product could occur and could lead to an increase in the potential risks.

A process which is likewise integrated and comprises a direct synthesis for the preparation of hydrogen peroxide and an epoxidation of an olefin is known from DE-OS 198 571 37 A1. The direct synthesis is carried out here in an alcoholic or aqueous-alcoholic medium, in particular methanol, which contains, as a stabilizer, a mineral acid and an alkali halide. According to the examples, methanolic hydrogen peroxide solutions with an $H_2O_2$ content in the range from 2 to 6 wt. % can be obtained using a suspension catalyst and an $O_2/H_2$ gas mixture (92:8) and can be employed in the epoxidation stage. A disadvantage of this process is that the high $H_2O_2$ concentrations mentioned evidently can be obtained only if a gas stream of oxygen and hydrogen, which is already in the explosive range, is passed through the reaction medium. In industrial processes, however, attempts are as a rule made to work outside the explosive range, in order to avoid expensive safety devices for carrying out the process.

In U.S. Pat. No. 5,840,934, which likewise relates to the direct synthesis for the preparation of hydrogen peroxide and a subsequent epoxidation of an olefin, the $H_2O_2$ concentration of the methanolic hydrogen peroxide solution obtained in the direct synthesis in the presence of a palladium catalyst and sulfuric acid and sodium bromide as stabilizers is stated as 0.15 and 0.35 wt. % respectively. In this case the direct synthesis takes place outside the explosion limit. Because of the low $H_2O_2$ concentration in the methanolic hydrogen peroxide solution, the epoxidation is carried out in the presence of a large amount of the solvent, which leads to a low space/time yield and therefore increased operating costs.

U.S. Pat. No. 4,336,238 describes a process for the preparation of $H_2O_2$ solutions in an organic-aqueous solution in the presence of a Pd/C supported catalyst, which is used as a suspension catalyst or as a fixed bed catalyst. The gas mixture of $H_2$ and $O_2$ mentioned in the examples is always in the explosive range, which is a substantial disadvantage. A high productivity (kg $H_2O_2$/kg Pd·h) is indeed achieved with a fixed bed catalyst under the operating conditions chosen, but the $H_2O_2$ concentration is below 2 wt. %. Further disadvantages of this process are the rapid deactivation of the catalyst and the discharge of noble metal. This document also describes the influence of the acid concentration on the selectivity, the $H_2O_2$ concentration and the activity of the catalyst. The activity of a deactivated catalyst can be increased again by significantly increasing the acid concentration of the aqueous-organic medium and/or the reaction temperature over a period of several hours. After this partial activation, the acid concentration and/or temperature can be taken back to a value such as is favourable in respect of the preparation of a solution with a higher $H_2O_2$ concentration. Disadvantages of this process are the requirements of having to take expensive measures for reactivation of the catalyst and recovery of noble metal discharged with the $H_2O_2$ solution, and the safety problems caused by the active charcoal support material.

According to EP 0 049 806 A1, the $H_2O_2$ yield can be increased and the discharge of Pd reduced in the direct synthesis known from U.S. Pat. No. 4,336,238 if methanol is used as the solvent instead of water. However, to stabilize the hydrogen peroxide in methanol, formaldehyde is added to this. The presence of formaldehyde in the methanolic hydrogen peroxide solution, however, is a disadvantage in respect of the use of the organic hydrogen peroxide solution obtained in this manner as an oxidizing agent, because side reactions and/or a reduction in the yield with respect to hydrogen peroxide can occur.

According to DE-OS 196 427 70, organic hydrogen peroxide solutions with a hydrogen peroxide content of at least 2.5 wt. % can be obtained by direct synthesis using $H_2/O_2$ mixtures outside the explosive range by carrying out the reaction in the presence of a $C_1$ to $C_3$-alkanol as the reaction medium on specific shaped bodies of catalyst, in particular monolithic shaped bodies. For the preparation of the methanolic hydrogen peroxide solutions with 5.6 to 7 wt. % hydrogen peroxide given by way of example, however, a gas mixture which falls in the explosive range is passed over the catalyst. The monolithic shaped bodies of catalyst are expensive. As can be seen from examples 1 and 2, a severe deactivation of the catalyst occurs in this process during continuous operation.

An object of the present invention is to provide a further process for the direct synthesis of hydrogen peroxide which allows the preparation of aqueous-organic and organic hydrogen peroxide solutions with an $H_2O_2$ content of at least 3 wt. %, but for the preparation of which the use or the occurrence of gas mixtures in the explosive range can be reliably avoided.

Another object relates to designing the process such that the catalyst in the reaction of hydrogen and oxygen has a high selectivity and at the same time a high service life and high catalyst productivity.

According to another object, the process should also be suitable for integration into a process for the oxidation of an organic substrate with hydrogen peroxide.

SUMMARY OF THE INVENTION

These and further objects such as can be seen from the following description can be achieved by the process according to the invention.

A process has been found for the preparation of an organic or organic-aqueous hydrogen peroxide solution by direct synthesis, wherein hydrogen and oxygen are passed, in the presence of a water-soluble organic solvent, over a fixed bed of catalyst particles which are bonded to a support or a mixture of catalyst-containing and catalyst-free particles, characterized in that a non-explosive gas mixture comprising $H_2$ and $O_2$ is employed, and a reaction medium which comprises the water-soluble organic solvent and a bromide and/or iodide is passed over the fixed bed with a cross-section loading of at least 0.3 m/h.

By the reaction procedure according to the invention as defined herein and as shown by the preferred embodiments, it is possible to obtain a high hydrogen peroxide concentration in the particular solvent from the beginning in the direct synthesis outside the explosive range. Furthermore, high service lives of the catalyst can be obtained by the reaction conditions according to the invention. In the case of the particularly preferred trickle bed procedure and a catalyst bed which comprises an oxidic material as a support or diluent, no discharge of Pd was to be detected. Surprisingly, in spite of a high cross-section loading, neither a palladium carry out nor a decrease in catalyst activity and reduction in the service life of the catalyst occurs in the process according to the invention.

DETAILED DESCRIPTION OF THE INVENTION

The maximum cross-section loading depends in particular on the particle size of the catalyst fixed bed and on the mode of operation, namely bubble or trickle bed procedure. In the preferred trickle bed procedure, which, in respect of the gas, can be operated in co-current or counter-current to the liquid, the cross-section loading is below that value at which the liquid backs up on/in the fixed bed. In the trickle bed procedure, the maximum cross-section loading at the conventional particle size of the fixed bed is usually below 10 m/h, and is usually in the range from 0.3 to 5 m/h, in particular 0.3 to 2 m/h. A cross-section loading of greater than 2 m/h requires a particle size of in general about or greater than 2 mm. At a fixed bed particle size in the range from 0.1 to 0.5 mm, a cross-section loading in the range from 0.4 to 1 m/h in the co-current trickle bed procedure is particularly suitable.

The liquid cross-section loading according to the invention can be realized both in an aqueous-organic medium and in an organic medium, such as, in particular, an alcoholic medium, which can comprise a certain amount of water, in particular equal to or less than 20 wt. %. In the preparation of organic hydrogen peroxide solutions with optionally a low content of water, the process according to the invention has the advantage that such solutions with a hydrogen peroxide concentration in the range of preferably 4 to 10 wt. % can be used directly as the oxidizing agent for carrying out oxidation processes on organic substrates, such as, in particular, for the epoxidation of olefins.

Those solvents which can dissolve the hydrogen peroxide formed in the direct synthesis and water formed as a by-product are employed in the process according to the invention. In particular, such organic solvents are ketones and alcohols having up to 6 carbon atoms, in particular up to 4 carbon atoms. Particularly preferred solvents for carrying out the direct oxidation are methanol, ethanol, n-propanol and n-butanol. Methanol is particularly preferred. In respect of the use of the organic hydrogen peroxide solution, it is expedient if the water content in the organic solvent, where possible, is kept low. The water content in the organic medium is expediently limited to max. 20 wt. %, preferably 10 wt. %.

The catalyst employed in the direct synthesis according to the invention can be a catalyst known in the prior art which comprises noble metal and can be present either in a support-free form or in a form bonded to a support. Catalysts which are bonded to supports are particularly preferred. The catalytically active component of the catalyst comprises one or more noble metals in the pure form or in the form of alloys. Preferred noble metals are the platinum metals, in particular palladium and platinum, and gold. Elements from the series consisting of Rh, Ru, Ir, Cu and Ag can additionally be present. Particularly preferred catalysts comprise as the catalytically active metal at least 80 wt. % palladium and 0–20 wt. % platinum, and 0–20 wt. % gold and/or 0–5 wt. % silver in alloyed or non-alloyed form. According to a particularly preferred embodiment, a catalyst fixed bed in which the catalytically active particles have been produced by a spray or flame pyrolysis process according to EP 1 038 833 A1 is used.

The catalytically active noble metal particles can be on the surface of a support material and/or can be arranged in uniform distribution within a heap of an inert support material.

The supports are particulate materials, such as powders, extrudates, granules or other shaped bodies formed from a pulverulent material, excluding monolithic shaped bodies. It is possible to mix the catalytically active component present in very finely divided form with a pulverulent support material, to plastify the mixture, to shape it and to consolidate the shaped pieces by a calcination. According to one alternative, it is also possible for an already pre-produced shaped support to be impregnated with a suspension comprising the very finely divided catalytically active component, a so-called egg-shell catalyst being obtained. Known binders, such as water-glass, calcium oxalate, boric acid and other glass-forming compositions, can also be present during application of the catalytically active material on or in the support material. The application of the catalytically active material to a support material is conventionally followed by a calcining step at 300 to 600° C. Finally, the catalytically active supported catalysts can also be obtained by impregnation of the support with a solution which comprises a compound of the catalytically active metals, and subsequent hydrogenation, calcining and washing steps.

A catalyst bonded to a support is particularly preferably used, the catalytically active metal(s) and optionally one or more promoters having been applied to the support material in a manner known per se, or, during preparation of the support material, catalytically active noble metal particles having already been deposited on the surface thereof (see EP 1 038 833 A1).

The preferred oxidic or silicatic support material is, in particular, aluminium oxide, silica, titanium dioxide, zirconium dioxide and zeolites. The size of the particles in the fixed bed can be within wide ranges, in particular 0.1 to 10 mm; a small particle size leads to a higher drop in pressure, and if the particle size is too large the catalytically active surface area decreases. A particle size in the range from 0.1 to 5 mm, in particular 0.1 to 2 mm and particularly preferably 0.1 to 0.5 mm leads to high productivities.

As is generally known from the prior art, direct synthesis is in general carried out in the presence of suitable stabilizers for hydrogen peroxide, in order to avoid or at least reduce decomposition thereof during and/or after the preparation. Among the stabilizers, strong acids are preferably present, in particular a mineral acid, such as sulfuric acid, phosphoric acid and hydrochloric acid; sulfonic acids, phosphonic acids and carboxylic acids which are soluble in the medium can also be employed. The acid concentration in the organic or organic-aqueous liquid medium which takes up hydrogen peroxide formed can be within wide ranges, in particular in the range from 1 to 0.0001 equivalent/l; in practice, 0.1 to 0.001 equivalent of acid per 1 of medium is employed. Lower acid concentrations are preferred in respect of the further use of the hydrogen peroxide solution formed.

A further class of stabilizers which have proved suitable in the direct synthesis according to the invention comprises halides, in particular bromide and iodide. Such halides, which are contained in the liquid medium in a concentration in the range from $10^{-1}$ to $10^{-7}$ equivalent/l, in particular $10^{-2}$ to $10^{-6}$ equivalent/l, are often employed together with an acid stabilizer. 0.001 to 0.0001 equivalent of bromide and 0.02 to 0.05 equivalent of a mineral acid, in particular sulfuric acid, are particularly preferably employed.

Using a fixed bed reactor, the gas/liquid mixture can be passed in co-current over the fixed bed. According to an alternative embodiment, an aqueous-organic or organic solution comprising the stabilizers is allowed to trickle over the catalyst bed and the reaction gas is passed in co-current or in counter-current through the catalyst bed. Although it is in principle possible in the process according to the invention to employ a gas mixture comprising hydrogen and oxygen which is in the explosive range, a gas mixture which is reliably outside the explosion limit, also taking into account the solvent partial pressure established, is preferably used. The hydrogen content in the gas mixture to be used, which expediently also comprises inert gases, is limited to values of about/below 6% by volume, preferably about/below 5% by volume. In particular, the $H_2$ content is in the range from 3 to 5% by volume. The oxygen content in the gas mixture can be stoichiometric or more than stoichiometric. Oxygen is expediently employed exclusively or predominantly in the form of air. The oxygen content in the gas mixture to be employed is in general in the range from 10 to 50% by volume, in particular 15 to 30% by volume.

The conditions in respect of pressure and temperature correspond to those known from the prior art. Thus, the reaction temperature is in general in the range from 0 to 90° C.; a temperature range from 20 to 50° C. is preferred. The pressure is in general in the range from atmospheric pressure or a slight reduced pressure to about 10 MPa. The reaction is preferably carried out under a pressure in the range from 0.5 to 5 MPa.

The process according to the invention can be integrated in a particularly advantageous manner into an overall process for the oxidation of an organic substrate with hydrogen peroxide. A process has accordingly been found for the catalytic oxidation of an organic substrate from the series consisting of olefins, aromatic hydrocarbons, which can contain one or more substituents from the series consisting of alkyl, alkoxy and hydroxyl groups, and carbonyl compounds with an organic hydrogen peroxide solution, which can comprise up to 20 wt. % water, but preferably less than 10 wt. % water. The oxidation is carried out in the presence of an oxidation catalyst, in particular one from the series consisting of titanium or vanadium silicalites and other vanadium, molybdenum and/or tungsten compounds. An optionally water-containing organic hydrogen peroxide solution, in particular an alcoholic hydrogen peroxide solution, which has been produced by the process described above and is prepared immediately before the oxidation is used as the oxidizing agent.

The invention is illustrated by the following examples and comparison examples.

EXAMPLES

General Instructions:

Mixtures of metal particles and inert particles were employed as the catalysts. Catalytically active particles of 95% Pd and 5% Au were prepared analogously to DE 199 12 733. Granular alpha-aluminium oxide from Ceramtech AG called "Stemalox spray particles, calcined 0–0.5 mm $Al_2O_3$ content 85%" was used as the inert material before use, the granules were freed from the fraction <0.1 mm by sieving. The very fine-particled metallic catalyst powder was mixed with an oxidic support powder.

The Pd content of the mixture of catalyst particles and inert particles was 2.5 wt. % in the case of the experiments with water as the solvent and 0.25 wt. % in the case of the experiments with methanol as the solvent.

All the experiments on the direct synthesis, apart from example 2, were carried out in a trickle bed reactor of 16 mm internal diameter and 40 cm length. The catalyst weight employed was 148 g at a bulk goods volume of about 80 ml. The pressure was 5 MPa (50 bar), the flow rate of the liquid reaction medium, that is to say the solvent for $H_2O_2$, was 30–120 ml/h, and that of the gas was 230 Nl/h. The gas comprised 3 vol. % hydrogen, 20 vol. % oxygen and 77 vol. % nitrogen and was passed in co-current to the liquid reaction medium trickling over the fixed bed. The reaction temperature was 25° C. The solvent for $H_2O_2$ moreover contained sodium bromide and $H_2SO_4$.

Comparison Example 1

Water with 0.001 mol/l bromide and 0.01 mol/l sulfuric acid was chosen as the solvent at the intake of the trickle bed reactor. The flow rate of the solvent for $H_2O_2$ was 120 ml/h, and that of the gas was 230 Nl/h. From the flow rate of the liquid and the reactor cross-section, a liquid cross-section loading of 0.6 m/h results.

The $H_2$ conversion was 70%. The $H_2O_2$ selectivity in respect of the $H_2$ reacted was 71%. The $H_2O_2$ concentration at the end of the reactor was 4.95 wt. %. The palladium productivity was 1.6 $gH_2O_2/gPd\cdot h$.

Example 1

Methanol with 0.0002 mol/l bromide and 0.01 mol/l sulfuric acid was chosen as the solvent at the intake of the trickle bed reactor. The flow rate of the solvent for $H_2O_2$ was 120 ml/h, and that of the gas was 230 Nl/h. From the flow rate of the liquid and the reactor cross-section, a liquid cross-section loading of 0.6 m/h results.

After 10 h the $H_2$ conversion was 67%. The $H_2O_2$ selectivity in respect of the $H_2$ reacted was 72%. The $H_2O_2$ concentration at the end of the reactor was 5.11 wt. %. The palladium productivity was 13.8 $gH_2O_2/gPd\cdot h$. These values were still unchanged even after an experiment time of 2000 h. The catalyst thus achieved a high productivity even after a long operating time. No Pd was to be detected in the methanolic hydrogen peroxide solution (detection limit 0.01 ppm).

Example 2

The experiment was carried out in a trickle bed reactor of 8.8 mm internal diameter and 40 cm length. The catalyst weight employed was 30 g at a bulk goods volume of about 17.5 ml.

Methanol with 0.0002 mol/l bromide and 0.01 mol/l sulfuric acid was chosen as the solvent at the intake of the trickle bed reactor. The flow rate of the solvent for $H_2O_2$ was 30 ml/h, and that of the gas was 55 Nl/h. From the flow rate of the liquid and the reactor cross-section, a liquid cross-section loading of 0.5 m/h results.

The $H_2$ conversion was 68%. The $H_2O_2$ selectivity in respect of the $H_2$ reacted was 70%. The $H_2O_2$ concentration at the end of the reactor was 4.9 wt. %. The palladium productivity was 16.5 $gH_2O_2/gPd\cdot h$.

Comparison Example 2

Methanol with 0.0002 mol/l bromide and 0.01 mol/l sulfuric acid was chosen as the solvent at the intake of the trickle bed reactor. The flow rate of the solvent for $H_2O_2$ was 30 ml/h, and that of the gas was 230 Nl/h. From the flow rate of the liquid and the reactor cross-section, a liquid cross-section loading of 0.15 m/h results.

The $H_2$ conversion was 47%. The $H_2O_2$ selectivity in respect of the $H_2$ reacted was 29%. The $H_2O_2$ concentration at the end of the reactor was 5.88 wt. %. The palladium productivity was 4.1 $gH_2O_2/gPd\cdot h$.

Comparison Example 3

Water with 0.001 mol/l bromide and 0.01 mol/l sulfuric acid was chosen as the solvent at the intake of the trickle bed reactor. The flow rate of the solvent for $H_2O_2$ was 93 ml/h, and that of the gas was 232 Nl/h. From the flow rate of the liquid and the reactor cross-section, a liquid cross-section loading of 0.47 m/h results.

The $H_2$ conversion was 68%. The $H_2O_2$ selectivity in respect of the $H_2$ reacted was 57%. The $H_2O_2$ concentration at the end of the reactor was 5.16 wt. %. The palladium productivity was 1.4 $gH_2O_2/gPd\cdot h$.

As can be seen from examples 1 and 2 by comparison with comparison examples 1 and 3, the palladium productivity in the process according to the invention is about 10 mal higher than in the process using water as the solvent. This leads to a lower use of the expensive palladium. Comparison of comparison example 2 with examples 1 and 2 shows that a liquid cross-section loading below 0.3 m/h leads to a substantially lower palladium productivity.

Further variations and modifications of the foregoing will be apparent to those skilled in the art and are intended to be encompassed by the claims appended hereto.

German priority application 101 53 546.5 is relied on and incorporated herein by reference.

What is claimed is:

1. Process for the preparation of an organic or organic-aqueous hydrogen peroxide solution by direct synthesis, comprising passing a non-explosive gas mixture containing hydrogen and oxygen, in the presence of a water-soluble organic solvent reaction medium, over a catalyst fixed bed of catalyst particles which are bonded to a support or a mixture of catalyst-containing and catalyst-free particles, wherein said reaction medium contains the water-soluble organic solvent and at least one of a bromide or iodide and is passed over the fixed bed with a cross-section loading of at least 0.3 m/h.

2. The process according to claim 1, wherein the organic solvent is an alcohol.

3. The process according to claim 2, wherein the alcoholic solvent contains alcohol is selected from the group consisting of methanol, ethanol, n-propanol and n-butanol.

4. The process according to claim 1, wherein the solvent is methanol, which can contain up to 20 wt. % water.

5. The process according to claim 2, wherein the solvent is methanol, which can contain up to 20 wt. % water.

6. The process according to claim 1 wherein said fixed bed contains catalyst particles having a diameter of less than 2 mm.

7. The process according to claim 1 wherein said fixed bed contains catalyst particles having a diameter of less than 5 mm.

8. The process according to claim 2 wherein said fixed bed contains catalyst particles having a diameter of less than 5 mm.

9. The process according to claim 3 wherein said fixed bed contains catalyst particles having a diameter of less than 5 mm.

10. The process according to claim 1, further comprising allowing the reaction medium to trickle over the fixed bed and passing the non-explosive gas mixture in co- or counter-current.

11. The process according to claim 2, further comprising allowing the reaction medium to trickle over the fixed bed and passing the non-explosive gas mixture in co- or counter-current.

12. The process according to claim 3, further comprising allowing the reaction medium to trickle over the fixed bed and passing the non-explosive gas mixture in co- or counter-current.

13. The process according to claim 6, further comprising allowing the reaction medium to trickle over the fixed bed and passing the non-explosive gas mixture in co- or counter-current.

14. The process according to claim 1, further comprising operating the catalyst fixed bed in the trickle bed procedure and introducing the reaction medium on to the fixed bed with a cross-section loading in the range from 0.3 to 2 m/h.

15. The process according to claim 1, further comprising operating the catalyst fixed bed in the trickle bed procedure and introducing the reaction medium on to the fixed bed with a cross-section loading in the range from 0.4 to 1 m/h.

16. The process according to claim 1, wherein said reaction medium comprises $10^{-2}$ to $10^{-7}$ equivalent of bromide per 1.

17. The process according to claim 1, wherein said reaction medium comprises $10^{-2}$ to $10^{-6}$ equivalent of bromide per 1.

18. The process according to claim 1, wherein said reaction medium comprises a mineral acid, excluding hydrochloric acid, sulfonic acids and phosphonic acids in an amount of 0.1 to 0.001 equivalent/l.

19. The process according to claim 1, further comprising wherein the catalyst is a catalyst bonded to a support, the support is an oxidic or silicatic material, and the catalytically active metal is at least one noble metal, and optionally an element selected from the group consisting of Rh, Ru, Ir, Cu and Ag as promoters.

20. The process according to claim 1, further comprising wherein the catalyst is a catalyst bonded to a support, the support is an oxidic or silicatic material, selected from the group consisting of $Al_2O_3$, $SiO_2$, $TiO_2$, $ZrO_2$ and zeolites, and the catalytically active metal is selected from the group consisting of palladium, platinum and gold, and optionally an element selected from the group consisting of Rh, Ru, Ir, Cu and Ag as a promoter.

21. The process according to claim 1, wherein said fixed bed substantially comprises noble metal particles, and particles of an oxidic or silicalitic material.

22. The process according to claim 1, wherein said fixed bed substantially comprises Pd particles or particles of Pd and at least one promoter, and particles of an oxidic or silicalitic material.

* * * * *